(No Model.)

W. MACKINTOSH.
WET GAS METER.

No. 268,251. Patented Nov. 28, 1882.

WITNESSES:
Donn Twitchell
C. Sedgwick

INVENTOR:
W. Mackintosh
BY Munn & Co.
ATTORNEYS.

UNITED STATES PATENT OFFICE.

WILLIAM MACKINTOSH, OF CALLAO, PERU, SOUTH AMERICA.

WET GAS-METER.

SPECIFICATION forming part of Letters Patent No. 268,251, dated November 28, 1882.

Application filed July 22, 1882. (No model.)

*To all whom it may concern:*

Be it known that I, WILLIAM MACKINTOSH, of Callao, Peru, South America, have invented certain new and useful Improvements in Wet Gas-Meters, of which the following is a full, clear, and exact description.

My invention consists in certain novel features of construction of wet gas-meters, having the object to secure correct and unvarying measurement of the gas at all times without regard to the change in the water-level, and also to furnish a meter that shall not require to be charged with water except at long intervals.

Reference is to be had to the accompanying drawings, forming part of this specification, in which similar letters of reference indicate corresponding parts in all the figures.

Figure 4:
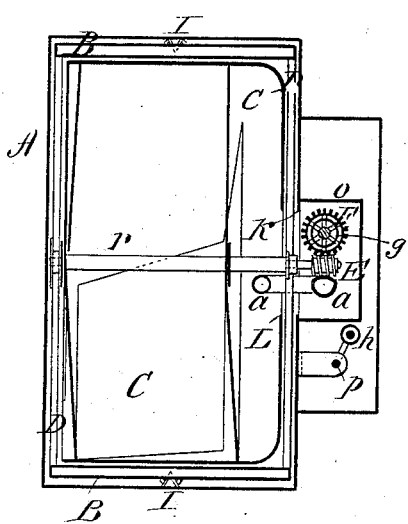
Figure 2:
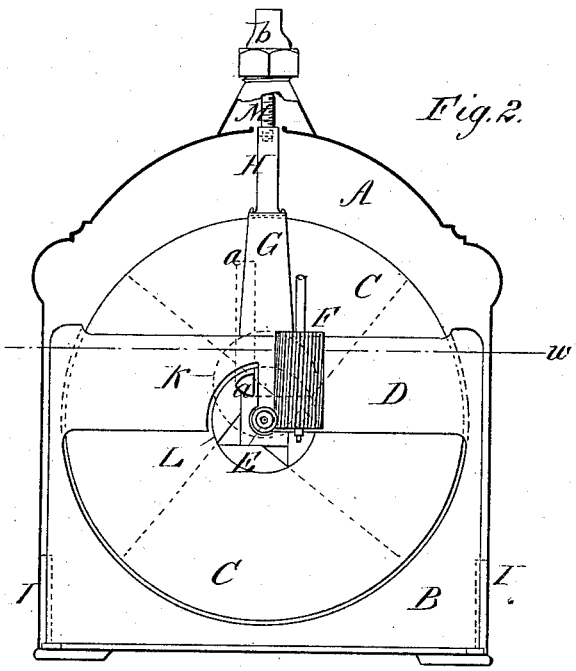
Figure 3:
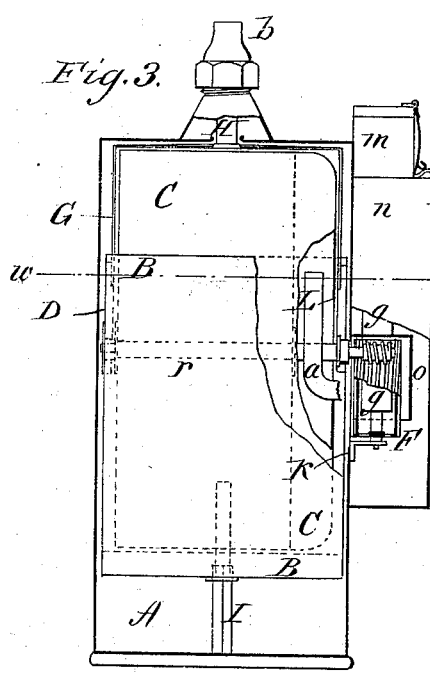
Figure 1:
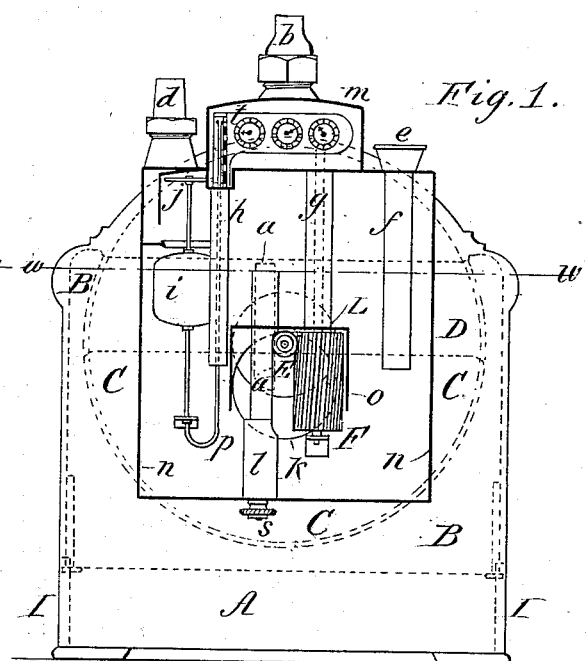
Figure 5:
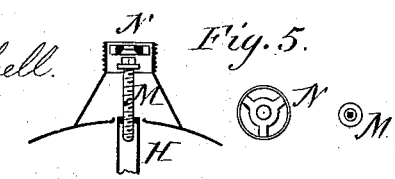

Figure 1 is a front view, with the face of the breast removed, showing in dotted lines the float and drum in an elevated position. Fig. 2 is a vertical section through the outer casing of the meter, showing the float and drum in their lower position. Fig. 3 is a side view of the meter, partly sectional. Fig. 4 is a horizontal section. Fig. 5 is a detail section, showing the outlet-coupling and the device for securing the float and drum against movement.

A is the outer casing of the meter containing the float B, which carries or supports the measuring-drum C.

D D are bearers fitted across the float for supporting axis $r$ of the drum.

E is a worm upon the end of the shaft of the measuring-drum.

F is a long worm-wheel or toothed cylinder, sustained on a shaft by suitable bearings in the breast $n$, and engaging the worm E.

H is the upper central guide of the float, fixed on a bridge, G, to work in an aperture of case A; and l I are the lower guides of the float.

M is a screw in the upper end of the guide H, and terminating beneath a bridge, N, that is fitted in the outlet-cone.

$a$ is the spout-tube, extending from the case $n$ into the measuring-drum C, through a circular opening, K, at the center of the drum.

$b$ is the outlet-coupling.

$d$ is the inlet-coupling.

$e$ is a water-funnel, provided with tube $f$ for filling the meter.

$g$ is the tube, containing the spindle of the worm-wheel F.

$m$ is the box, containing the index mechanism, with which the worm-wheel F is connected.

$p$ is a bent wire, fitted at one end with a float, $i$, and formed at the other end as a gage, $t$, for indicating the height of water, and also carrying above the float $i$ a stop-valve, $j$, which, when the float is in its lowest position, closes the gas-inlet.

$o$ is a trap or casing immediately surrounding the worm-wheel F and worm E and opening K in the division-plate, so as to prevent escape of gas through the opening K to the measuring-drum without being registered, when the water is low.

$s$ is the plug for adjusting the water-level.

$w$ $w$ in Figs. 1 and 3 show the water-line at the highest point with the meter ready for operation, in which case, as will be seen, the worm E of the drum engages the upper end of the worm-wheel F. As the water-level falls the float B, moving downward, will carry the drum downward, and the worm E will move down upon the worm-wheel F until it reaches the lowest point, as shown in Fig. 2, when the gas will be shut out of the meter by the valve $j$. By this construction the meter will register correctly in any position of the float between the highest and lowest points. The extent of this movement will vary according to the size of the meter, and in the smallest size meters the evaporation required to move the float to its lowest point being considerable, the meter will operate for a long period of time without having to be recharged with water.

To prevent any movement of the float and injury of the same during transportation, the screw M is to be turned by a suitable key, inserted through the inlet-cone until the screw comes in contact with the bridge N, when in that case the float will be held down upon the bottom of the meter, as in Fig. 2.

Having thus fully described my invention, I claim as new and desire to secure by Letters Patent—

1. The combination, with the measuring-drum C, having axis or shaft $r$, of the float B, having cross-beams D D, whereby the drum is supported by the float, as described.

2. The dip case or trap o, fitted around the worm-gearing F E, and covering the opening to the drum, substantially as shown and described.

3. The screw M, in combination with the guide H and the float, for securing the float and drum in position, substantially as shown and described.

4. The combination of the inlet-cone d, the screw M, and the bridge N, whereby the screw may be operated, as and for the purpose specified.

WILLIAM MACKINTOSH.

Witnesses:
 JOHN KERR,
 PATRICK ANDERSON BLACK.